United States Patent Office.

CHRISTIAN S. RAUH, OF BOSTON, MASSACHUSETTS.

*Letters Patent No. 96,148, dated October 26, 1869.*

IMPROVED COMPOUND FOR MAKING WATER-PROOF PAPER.

The Schedule referred to in these Letters Patent and making part of the same.

*To all whom it may concern:*

Be it known that I, CHRISTIAN S. RAUH, of Boston, in the county of Suffolk, and State of Massachusetts, have invented or discovered a new and useful compound or mixture, which, applied to paper, will make the same water-proof, so, that when rolled, the same can be cleansed without injury to the paper; and I hereby declare that the following is a full and exact description of the method of compounding and applying the same.

For one gallon of the compound or mixture, take one-half pound of wax, (white wax preferred,) one ounce of Venetian turpentine, three-fourths of a pound of gum-dammar, and three-fourths of a gallon of spirits of turpentine; and for any quantity, mix in about these proportions.

To prepare this compound, take the wax, the gum-dammar, and the Venetian turpentine, in the above proportions, and put them together in a close or air-tight vessel, and boil them until the same is dissolved. Add these ingredients in said proportions, the same being so or otherwise dissolved, to the spirits of turpentine in the above proportions, and, before using, stir or shake them well together.

To apply the mixture so compounded, take a soft or camel's-hair brush, and apply the liquid to the paper in the same manner as one would apply varnish or any liquid to any material, covering the entire outer surface. The paper, when dried, may be used as in all cases and for all purposes. Paper used for covering the walls of rooms, treated with this preparation, may be cleansed, when soiled, with water or soap and water, without any injury to the paper. So of collars and articles of wearing-apparel made of paper; after treatment with this mixture, as above described, they can be cleansed with soap and water, applied by a sponge or cloth, without injury to the article. It has this advantage over all preparations for the same purpose: it leaves no gloss; it does not change the appearance of white paper. Colored paper, as wall-paper, will be made, perhaps, a half shade darker, or thereabout, so that in preparing or selecting paper to be treated with this preparation, the shade should be taken into account. In all respects, paper thus treated and prepared may be used for all the various purposes for which paper is used. The compound is novel, and is of great utility for the use of wall-paper alone.

The ingredients are known in commerce by the above names, or may have different names, having the same properties or qualities, or their equivalents.

What I claim as my invention, and desire to secure by Letters Patent, is—

The application and use of the above ingredients, or their equivalents, when compounded substantially in or about the proportions set forth, and in the manner and for the purpose described.

CHRISTIAN S. RAUH.

Witnesses:
 WILLIAM EDSON,
 J. L. NEWTON.